(12) United States Patent
Thaliath et al.

(10) Patent No.: US 11,719,410 B2
(45) Date of Patent: Aug. 8, 2023

(54) VEHICLE LAMP ASSEMBLY

(71) Applicant: Dyson Technology Limited, Wiltshire (GB)

(72) Inventors: Vinu Thaliath, Bristol (GB); Matthew Jonathan Stubbs, Newport (GB)

(73) Assignee: Dyson Technology Limited, Wiltshire (GB)

( * ) Notice: Subject to any disclaimer, the term of this patent is extended or adjusted under 35 U.S.C. 154(b) by 30 days.

(21) Appl. No.: 17/624,971

(22) PCT Filed: Jun. 23, 2020

(86) PCT No.: PCT/GB2020/051516
§ 371 (c)(1),
(2) Date: Jan. 5, 2022

(87) PCT Pub. No.: WO2021/005330
PCT Pub. Date: Jan. 14, 2021

(65) Prior Publication Data
US 2022/0260228 A1 Aug. 18, 2022

(30) Foreign Application Priority Data
Jul. 11, 2019 (GB) ..................................... 1909977

(51) Int. Cl.
*F21S 43/245* (2018.01)
*F21S 43/40* (2018.01)
(Continued)

(52) U.S. Cl.
CPC .............. *F21S 43/245* (2018.01); *B60Q 1/44* (2013.01); *F21S 43/14* (2018.01); *F21S 43/239* (2018.01); *F21S 43/40* (2018.01); *F21Y 2115/10* (2016.08)

(58) Field of Classification Search
CPC ....................................................... F21S 41/24
See application file for complete search history.

(56) References Cited

U.S. PATENT DOCUMENTS

| 3,491,336 A | 1/1970 | Anderson |
| 4,740,871 A | 4/1988 | Dilouya |

(Continued)

FOREIGN PATENT DOCUMENTS

| CN | 107357002 A | 11/2017 |
| CZ | 305927 B6 | 5/2016 |

(Continued)

OTHER PUBLICATIONS

International Search Report and Written Opinion received for PCT Patent Application No. PCT/GB20/051516, dated Nov. 12, 2020, 14 pages.

(Continued)

*Primary Examiner* — Eric T Eide
(74) *Attorney, Agent, or Firm* — Faegre Drinker Biddle & Reath LLP (57) ABSTRACT

A vehicle head or tail lamp assembly is disclosed. The lamp assembly includes a light emitter having a rectangular surface from which light is emitted; and a back surface having a light reflection factor less than 80%. The back surface defines a border visible adjacent at least three sides of the rectangular surface when the lamp assembly is viewed along an axis projecting normally from the rectangular surface.

14 Claims, 10 Drawing Sheets

(51) Int. Cl.
  *F21S 43/14* (2018.01)
  *F21S 43/239* (2018.01)
  *F21Y 115/10* (2016.01)
  *B60Q 1/44* (2006.01)

(56) References Cited

U.S. PATENT DOCUMENTS

| | | | |
|---|---|---|---|
| 5,669,693 | A | 9/1997 | Smith |
| 8,956,026 | B2 | 2/2015 | Bungenstock |
| 9,759,396 | B2 | 9/2017 | Bungenstock et al. |
| 9,995,451 | B2 | 6/2018 | Brosinger et al. |
| 10,808,902 | B1 * | 10/2020 | Lim .................. F21S 41/285 |
| 2005/0111235 | A1 | 5/2005 | Suzuki et al. |
| 2005/0259939 | A1 | 11/2005 | Rinko |
| 2006/0164839 | A1 | 7/2006 | Stefanov |
| 2007/0195540 | A1 | 8/2007 | Misawa et al. |
| 2007/0211487 | A1 | 9/2007 | Sormani |
| 2008/0186726 | A1 | 8/2008 | Okada |
| 2008/0232127 | A1 | 9/2008 | Futami |
| 2009/0154186 | A1 | 6/2009 | Natsume et al. |
| 2010/0008088 | A1 | 1/2010 | Koizumi et al. |
| 2011/0007518 | A1 | 1/2011 | de Lamberterie |
| 2011/0216549 | A1 | 9/2011 | Futami |
| 2012/0099310 | A1 | 4/2012 | Kropac et al. |
| 2014/0036526 | A1 | 2/2014 | Sato et al. |
| 2017/0307169 | A1 | 10/2017 | Feil et al. |
| 2018/0022269 | A1 | 1/2018 | Mügge et al. |
| 2018/0066826 | A1 * | 3/2018 | Di Trapani ........... F21V 7/0008 |
| 2020/0080698 | A1 * | 3/2020 | Fukui .................. F21S 41/24 |

FOREIGN PATENT DOCUMENTS

| | | | |
|---|---|---|---|
| DE | 3239754 | A1 | 5/1984 |
| DE | 4129094 | A1 | 3/1993 |
| DE | 29807774 | U1 | 7/1998 |
| DE | 20205110 | U1 | 8/2002 |
| DE | 10143544 | A1 | 4/2003 |
| DE | 10214503 | A1 | 10/2003 |
| DE | 102006007134 | A1 | 8/2007 |
| DE | 102007005183 | A1 | 8/2008 |
| DE | 102007038470 | A1 | 2/2009 |
| DE | 102008030746 | A1 | 12/2009 |
| DE | 102008034052 | A1 | 1/2010 |
| DE | 102008038668 | A1 | 2/2010 |
| DE | 102008056985 | A1 | 5/2010 |
| DE | 102010012745 | A1 | 9/2011 |
| DE | 102010012746 | A1 | 9/2011 |
| DE | 102011055431 | A1 | 5/2013 |
| DE | 102012101455 | A1 | 8/2013 |
| DE | 102012103310 | A1 | 10/2013 |
| DE | 102012215124 | A1 | 2/2014 |
| DE | 202014100942 | U1 | 3/2014 |
| DE | 102012112125 | A1 | 6/2014 |
| DE | 102013103410 | A1 | 10/2014 |
| DE | 202017103875 | U1 | 10/2018 |
| EP | 0857913 | A2 | 8/1998 |
| EP | 0933587 | A2 | 8/1999 |
| EP | 0933588 | A2 | 8/1999 |
| EP | 0935091 | A1 | 8/1999 |
| EP | 0936403 | A2 | 8/1999 |
| EP | 2161494 | A1 | 3/2010 |
| EP | 2390561 | A1 | 11/2011 |
| EP | 3009301 | A1 | 4/2016 |
| EP | 3112215 | A1 | 1/2017 |
| EP | 3447369 | A1 | 2/2019 |
| FR | 3000569 | A1 | 7/2014 |
| JP | 2006-114309 | A | 4/2006 |
| JP | 2013-229153 | A | 11/2013 |
| JP | 2014-235819 | A | 12/2014 |
| JP | 2019169241 | A * | 10/2019 |
| WO | 2008/035154 | A1 | 3/2008 |
| WO | 2016/087644 | A1 | 6/2016 |
| WO | 2016/202427 | A1 | 12/2016 |
| WO | 2018/069792 | A1 | 4/2018 |
| WO | 2019/037803 | A1 | 2/2019 |

OTHER PUBLICATIONS

Search report received for United Kingdom Patent Application No. 1909977.9, dated Nov. 13, 2019, 1 page.

* cited by examiner

VEHICLE LAMP ASSEMBLY

RELATED APPLICATION DATA

This application is the National Stage of International Application No. PCT/GB2020/051516 filed Jun. 23, 2020, and claims benefit of United Kingdom Application No. 1909977.9 filed Jul. 11, 2019, each of which are herein incorporated by reference in their entirety.

FIELD OF THE INVENTION

The present invention relates to vehicle lamps.

BACKGROUND OF THE INVENTION

Vehicles, such as passenger cars, usually comprise head lamps and tail lamps mounted to front and rear ends respectively of the vehicle. It is desirable to enhance the visibility of the lamps to make the vehicle more noticeable to other road users.

SUMMARY OF THE INVENTION

According to an aspect of the present invention, there is provided a vehicle head or tail lamp assembly, comprising: a light emitter having a rectangular surface from which light is emitted; and a back surface having a light reflection factor less than 80%, wherein the back surface defines a border visible adjacent at least three sides of the rectangular surface when the lamp assembly is viewed along an axis projecting normally from the rectangular surface.

The light emitter is thus operable to emit light from the rectangular surface to present a rectangular illumination to an observer viewing the lamp along the normal axis, as may be the perspective of another road user driving towards the vehicle in an opposite direction, in the case of a head lamp, or following the vehicle, in the case of a tail lamp. The distinctive rectangular shape of the illumination as perceived by such a road user may advantageously be easily recognisable as marking a vehicle, as compared, for example, to resulting from a reflection of stray ambient light or another non-vehicular light source. Consequently an observer may be more aware of the vehicle's presence which may reduce the risk of vehicle collisions occurring.

The rectangular shape of the light emitter is particularly accentuated by the low reflection factor back surface, which defines a border visible adjacent, that is to say apparently contiguous with, the sides of the rectangular surface when the lamp assembly is viewed along the normal axis. In this arrangement the back surface, because of its relatively low reflection factor, may absorb a relatively high degree of incident light, thereby increasing the visual contrast between the rectangular surface of the light emitter and the back surface, and so enhancing the perceived 'sharpness' of the sides of the rectangular surface making the illumination appear even more distinctly rectangular to an observer. In particular, the relatively low reflection factor of the back surface may cause the back surface to appear dark, and so provide a relatively high degree of colour contrast with the light emission of the rectangular surface of the light emitter. The enhanced contrast between the rectangular surface of the light emitter and the back surface may further increase the likelihood of the vehicle being noticed by other road users and so reduce the risk of vehicle collisions. The border is preferably visible adjacent the full length of each of the three sides of the rectangular surface when viewed along the normal axis. In this arrangement a high degree of visual contrast between the rectangular surface and the back surface is achieved along the full length of each of the three sides, thereby best accentuating the distinctive rectangular shape of the rectangular surface. The back surface may even define a border visible adjacent four sides of the rectangular surface of the light emitter when viewed along the said normal axis. In this arrangement the shape of the rectangular surface of the light emitter may be further accentuated.

It has been found that adapting the back surface to have a light reflection factor even lower than 80% may further increase the perceived visual contrast between the light emission from the rectangular surface of the light emitter and the back surface. In particular, it has been found that reflection factors lower than 50%, and more preferably still lower than 30%, or more preferably still less than 20%, results in a particularly high degree of visual contrast between light emission of the rectangular surface and the back surface and effectively accentuate the rectangular shape of the surface. The back surface may therefore be adapted to have a light reflection factor less than 50%, or even less than 30%, or even less than 20%. Indeed, it has been found generally that the rectangular shape of the light emitter appears most distinctive when the back surface has a very low reflection factor, such that almost all incident light is absorbed and the degree of visual contrast between the light emission of the rectangular surface and the back surface is greatest. The back surface may therefore even be adapted to have a light reflection factor as low as 10%, or less than 10%, or even less than 5%. Where the back surface has a reflection factor less than 10% it is likely to be perceived by a user as very dark, even black. A very dark or black appearance to the back surface advantageously provides an exceptionally high degree of visual contrast to many commonly used colours of light likely to be emitted by the rectangular surface. Thus, a back surface having a reflection factor less than 10% or less than 5% is particularly suited to applications where the light emitter may be expected to emit light of different colours. Preferably the back surface is adapted to appear matt black under white light. In many applications a matt black appearance may provide a very high degree of colour contrast between the rectangular surface of the light emitter and the back surface.

However, in conflict with the above general desire for the light reflection factor of the back surface to be as low as possible to improve the visual contrast with the light emitter, at low reflection factors the back surface absorbs a relatively great proportion of incident light, and consequently the structure defining the back surface tends to be heated to a greater degree. Such heating may be damaging to the back surface structure and the other components of the lamp assembly by radiation from the back surface structure. For this reason in certain applications it is desirable that the reflection factor of the back surface is greater than 5%, or even greater than 10%, as this may typically represent a good compromise between visual contrast and thermal heating. Indeed, it has been found that in many applications a good compromise between these two factors exists where the back surface has a reflection factor between 20% and 5%.

Moreover, to further mitigate the effect of heating of the back surface, the light emitter may comprise a non-incandescent light source. For example, the light emitter may comprise one or more light emitting diodes (LEDs). The heat energy generated by non-incandescent light sources, such as LEDs, may typically be greatly reduced compared to incandescent light sources for a given light emission level, so reducing any further heating of the back surface and/or other components of the lamp assembly and offsetting the effect of heating of the back surface by light absorption. This has been found to be particularly advantageous where the back surface has a very low light reflection factor, for example, a light reflection factor less than 20%.

The back surface may be non-mirrored. In other words, the back surface may be a diffuse not a specular reflector; that is to say, the back surface may be adapted such that a major proportion of reflected light is scattered and only a minor proportion reflected specularly. A non-mirrored finish to the back surface may advantageously result in better diffusion of the light that is reflected, so reducing the apparent brightness of regions of the back surface exposed to peak levels of incident light. Consequently, the visual contrast between the light emission of the rectangular surface and the back surface may be further increased.

It has been found that the perceived visual contrast between the light emission of the rectangular surface and the border defined by the back surface increases significantly as the width of the border is increased. The reference herein to the "width" of the border is a reference to the distance between an inner diameter of the border, i.e. the contour which appears adjacent to the peripheral edge of the rectangular surface when the lamp assembly is viewed along the normal axis, and an outer diameter of the border. As a general rule, it has been observed that borders having a relatively great width will appear more prominent to an observer, in particular to an observer viewing the vehicle from a relatively great distance, and as a result increase the perceived visual contrast between the light emission of the rectangular surface and the border. It has been found that to be visually effective from even a relatively short distance the border should have a width of at least 10 millimetre. Moreover, it has been found that where the border has a width of at least 20 millimetre a relatively high degree of perceived visual contrast between the light emission of the rectangular surface and the border is achieved. Thus, in an embodiment the border may have a width of at least 20 millimetre. In other embodiments the border may have a width of at least 30 millimetre, or even at least 40 millimetre, or even at least 50 millimetre. A compromise must be found here however between increasing the width of the border to increase visual contrast with the light emission of the rectangular surface and minimising the overall dimensions of the lamp assembly. Corners of the rectangular surface may have radii of curvature less than 5 millimetre. This results in a particularly sharp and distinctive appearance to the rectangular surface, thereby increasing the likelihood of other road users noticing the lamp assembly. Consequently, the risk of a collision with the vehicle is further reduced.

The rectangular surface may be square. A square shape may be perceived by an observer as particularly un-natural, and is therefore more likely to be recognised by an observer as marking a vehicle and less likely to be mistaken for an ambient/non-vehicular light source. Consequently, the risk of a collision with the vehicle is further reduced.

The lamp assembly may comprise a plastic structure having a surface defining the back surface. Plastic may advantageously be readily formed to an appropriate shape for the back surface. Further, plastics typically have relatively low thermal transmissivity characteristics, typically lower than metals, and may thus better thermally insulate regions behind the back surface from thermal energy resulting from absorption of light energy by the back surface. Consequently, thermal damage to components located in the region behind the back surface may be reduced or prevented. This consideration is particularly important where the reflection factor of the back surface is very low, as the amount of light energy absorbed and thus the heat generated may be expected to be relatively great.

The lamp assembly may comprise a housing, and the back surface may be defined by an anti-reflective surface coating applied to a wall of the housing. This then has the advantage of providing even lower reflection factors resulting from the anti-reflective surface coating. Further, the housing may be relatively easily formed without particular regard for its surface finish/inherent reflection factor, and the anti-reflective surface coating may subsequently be applied as a second manufacturing step to reduce the reflection factor. As an alternative to a surface coating, the desired low reflection factor could alternatively be achieved by applying a suitable additive, such as a pigment or other colouring, into a melt, for example a plastic melt, from which the housing is formed, thus negating the need for a separate manufacturing step of applying an anti-reflective coating.

The anti-reflective coating may be non-metallic. Non-metallic coatings may typically be relatively chemically-stable. For example, the anti-reflective surface coating may comprise a paint, which may desirably be relatively easy to apply to the surface of the plastics structure. In contrast, metallic coatings may disadvantageously be highly susceptible to corrosion or tarnishing over time, which may negatively affect the reflection factor of the back surface.

The back surface may extend behind the rectangular surface of the light emitter. In this arrangement the back surface may most effectively absorb stray light emitted in a backwards direction by the light emitter. Consequently, the brightness of the regions surrounding the light emitter may be further reduced, and so the perceived visual contrast between the light emission of the rectangular surface and the surrounding regions may be increased.

The back surface may be at least partially concave and extend forwardly from behind the rectangular surface. In this arrangement the back surface may absorb stray light directed sidewardly of the light emitter. Consequently, the brightness of the regions surrounding the light emitter may be further reduced, and so the perceived visual contrast between the light emission of the rectangular surface and the surrounding regions may be increased.

The light emitter may comprise an illuminating portion that defines the rectangular surface, the back surface may extend behind the illuminating portion, and the illuminating portion may be translucent or transparent when viewed along the axis normal to the rectangular surface. In this arrangement, because the illuminating portion is transparent or translucent, when the illuminating portion is not illuminated, for example, when the vehicle is not in use, the illuminating portion may be less visible to an observer and the back surface may be visible therethrough. This may result in a pleasing aesthetic.

The lamp assembly may comprise a further light emitter spaced apart from the light emitter, and a portion of the border defined by the back surface may be visible between the rectangular surface and the further light emitter when the lamp assembly is viewed along the axis projecting normally from the rectangular surface of the light emitter. In this arrangement the lamp assembly thus comprises two light emitters that are visibly divided by the border when the lamp assembly is viewed along the normal axis. The two light emitters may advantageously facilitate a greater total light output and/or the light emitters may be assigned different signalling functions. Because the light emitters are visibly divided by the border the distinctiveness of the light emission from the rectangular surface of the light emitter is maintained. Furthermore, the visual separation between the light emitters provided by the border may reduce the risk of blurring of the respective light emissions, which could obscure the nature of a lighting signal or colour emitted by either of the light emitters.

The further light emitter may comprise a further rectangular surface from which light is emitted, and the further rectangular surface may be arranged parallel to the rectangular surface. A parallel arrangement of the two rectangular surfaces has been found to present a particularly distinctive visual appearance thereby increasing the likelihood of other road user's noticing the lamp assembly. Consequently, the risk of a collision with the vehicle is further reduced.

The back surface may define a further border visible adjacent at least three side of the further rectangular surface when the lamp assembly is viewed along a further axis projecting normally from the further rectangular surface, and the further border appears continuous with the border when viewed along the further axis. The border visible adjacent the sides of the further rectangular surface may enhance the distinctiveness of the light emission from the further light emitter.

According to a second aspect of the present invention there is provided a vehicle comprising a lamp assembly mounted to an exterior of the vehicle at a front or rear end of the vehicle.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 1:
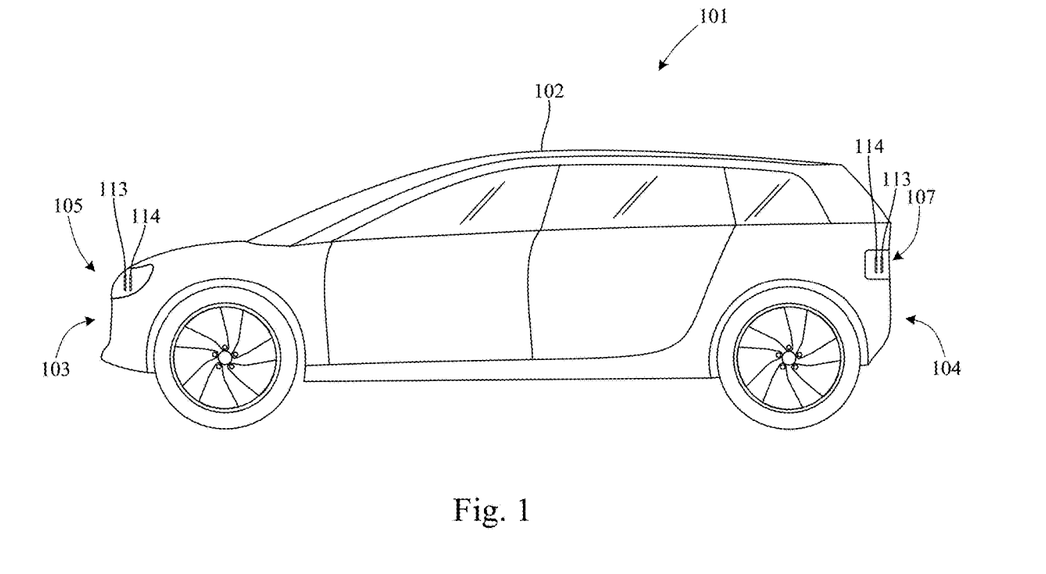
FIG. 1 is an illustrative side view of a passenger car comprising head lamps and tail lamps embodying the present invention.
Figure 2:
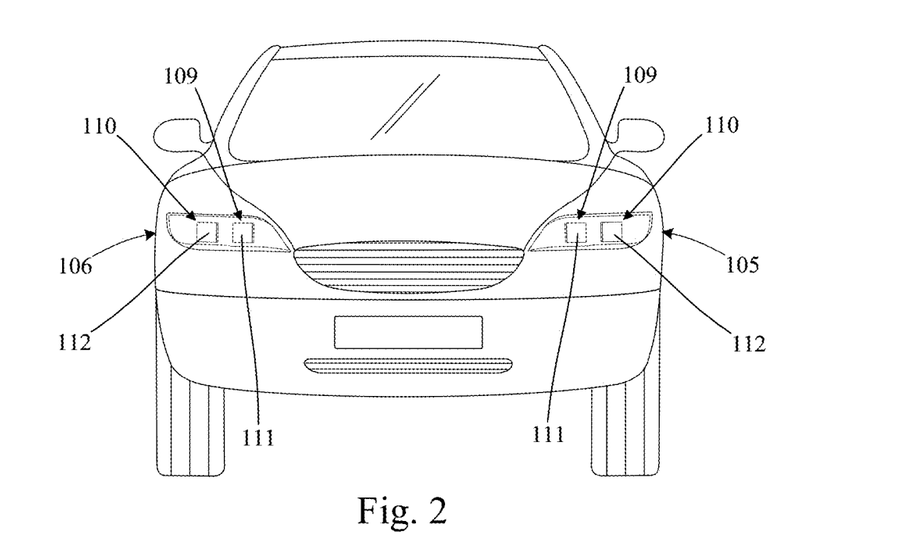
FIG. 2 is a front view of the passenger car showing the head lamps.
Figure 3:
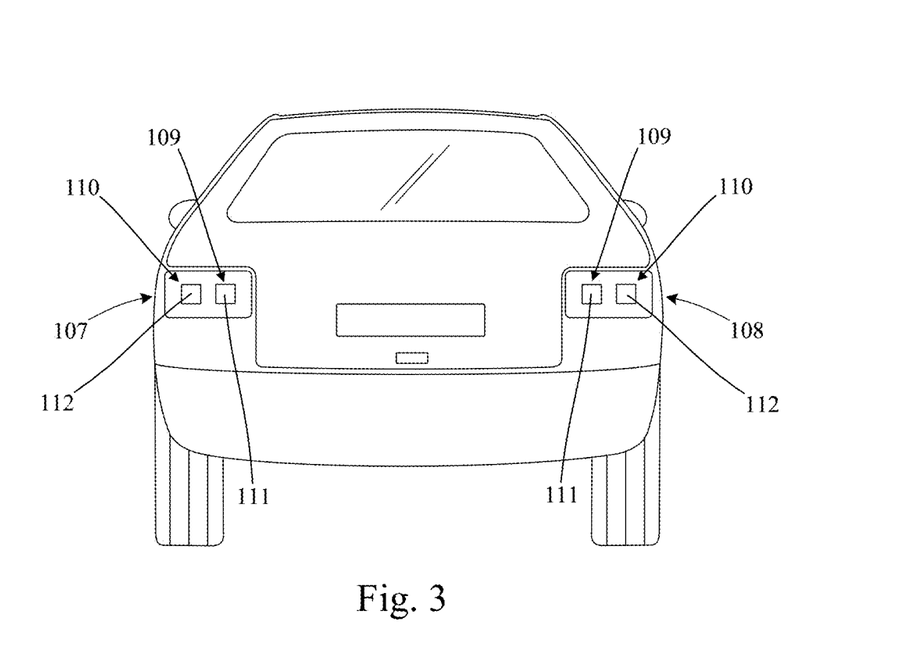
FIG. 3 is an illustrative rear view of the passenger car showing the tail lamps.

A vehicle, in the form of a passenger car 101, embodying an example of the present invention is shown illustratively in FIGS. 1, 2 and 3.

Referring to the Figures, the vehicle 101 comprises a body structure 102 having a front end 103 facing in a forward direction of travel of the vehicle and a rear end 104 facing in a rearward direction of travel of the vehicle. Head lamp assembly pair 105, 106 are mounted to left and right sides respectively of the front end 103 of the body 102 for projecting light forwardly of the vehicle, and tail lamp assembly pair 107, 108 are mounted to left and right sides respectively of the rear end 104 of the body 102 for projecting light rearwardly of the vehicle.

Each of the lamp assemblies 105 to 108 comprises first and second light emitters 109, 110 arranged in a spaced-apart relationship. Each of the light emitters 109, 110 has a front surface 111, 112 respectively facing longitudinally, or lengthways, of the vehicle, i.e. facing forwardly in the case of head lamp assemblies 105, 106, or rearwardly in the case of tail lamp assemblies 107, 108, of the vehicle, and a side surface 113, 114 respectively facing transversely, or sideways, of the vehicle, i.e. facing leftwardly of the vehicle in the case of lamp assemblies 105, 107, or rightwardly in the case of lamp assemblies 106, 108. Each of the light emitters 109, 110 is configured to emit light from the respective front surface 111, 112 and side surface 113, 114 thereof. As shown best in FIG. 1, the light emitters 109, 110 of each lamp assembly are spaced apart in the longitudinal direction of the vehicle such that the side surfaces 113, 114 of the light emitters 109, 110 respectively are both visible in a side view of the vehicle. Furthermore, as shown best in FIGS. 2 and 3, the light emitters 109, 110 of each lamp assembly are spaced apart in the transverse direction of the vehicle such that the front surfaces 111, 112 of the light emitters 109, 110 respectively are both visible in a front end view, in the case of head lamp assemblies 105, 106, or in a rear end view, in the case of tail lamp assemblies 107, 108, of the vehicle.

Each of the lamp assemblies 105 to 108 of the vehicle 101 is substantially identical in construction. For brevity therefore only head lamp assembly 105 will be described in detail herein, although it should be understood that the same teachings are generally applicable also to lamp assemblies 106, 107 and 108.

Referring in particular to FIGS. 4a to 4d, head lamp assembly 105 comprises principally a housing indicated generally at 401, and the first and second light emitters 109, 110 which are located within the housing 401.

Housing 401 comprises an optically transparent lens 402 forming a front to the lamp assembly and a rear casing 403 forming a back to the lamp assembly. Lens 402 is formed of moulded polycarbonate plastic. The rear casing 403 is formed of moulded acrylonitrile butadiene styrene (ABS) plastic. The lens 402 is joined to the rear casing 403 by an adhesive bond about its peripheral edge which creates a substantially hermetically sealed enclosure. A front compartment 404 is defined internally of the housing 401 behind the lens 402. The rear casing 403 comprises a wall 405 having a surface 406 which forms a back to the front compartment 404.

The surface 406 of the wall 405 is defined by an anti-reflective surface coating applied to the wall 405. The anti-reflective surface coating applied to the surface 406 functions to increase the proportion of light incident on the surface 406 that is absorbed by the wall 405 and thereby reduce the proportion of light incident on the surface 406 that is reflected by the wall 405. In the example, the anti-reflective surface coating comprises a matt black paint applied uniformly across the wall 405. The black paint is adapted such that the surface 406 has a relatively low reflection factor, specifically, in the example, a reflection factor of approximately 10 percent across its full area. The term 'reflection factor' as used herein is intended to characterise the ratio of reflected white light to incident white light at normal angles of incidence and reflection. In this respect, although the reflection factor measure only accurately characterises the reflectance of white light at the said angles of incidence and reflection, it may nevertheless be expected to be generally indicative also of the tendency of the surface to reflect other colours of light and/or light incident or reflected at alternative angles.

Many alternative coatings and treatments for the wall 405 to achieve a desirably low reflection factor are commercially available. For example, as an alternative to paint, the surface 406 could instead be defined by flock applied to the wall. As a further alternative, the surface 406 could be defined by micro-scale surface features, for example micro-recesses and/or protrusions formed on the wall 405. As a further exemplary alternative, the desired low reflection factor could alternatively be achieved by applying a suitable additive, such as a pigment or other colouring, into the plastic melt from which the wall is formed, thus negating the need for a separate manufacturing step of applying an anti-reflective coating to the wall 405 after setting of the plastic.

Each of the first and second light emitters 109, 110 comprises a generally plate-like illuminating portion 407, which defines the front surface 111, 112 respectively, and the side surface 113, 114 respectively thereof, and further comprises a light guide portion 408 arranged to guide light from a light source to the illuminating portion 407. In the example, the first and second light emitters 109, 110 are assigned different lighting functions. In the example, first light emitter 109 is assigned a running light function, and is configured to emit constant white light, whilst second light emitter 110 is assigned a direction indicator function and configured to emit pulsed amber light. The construction of the light emitters 109, 110 will be described in further detail with particular reference to FIGS. 5a, 5b and FIG. 6.

The illuminating portion 407 of each light emitter 109, 110 is located within the front compartment 404 behind the lens 402 and in front of the anti-reflective back surface 406. Each illuminating portion 407 is arranged with the respective front surface 111, 112 facing forwardly through the lens 402, i.e. with an axis A projecting in a forward direction normally from a centre of the front surface approximately parallel to a longitudinal centreline of the vehicle, and with the respective side surface 113, 114 thereof facing sidewardly through the lens 402, i.e. with an axis B projecting in a leftward direction normally from a centre of the side surface approximately orthogonal to the longitudinal centreline of the vehicle.

Figures 4A, 4B, 4C, 4D:
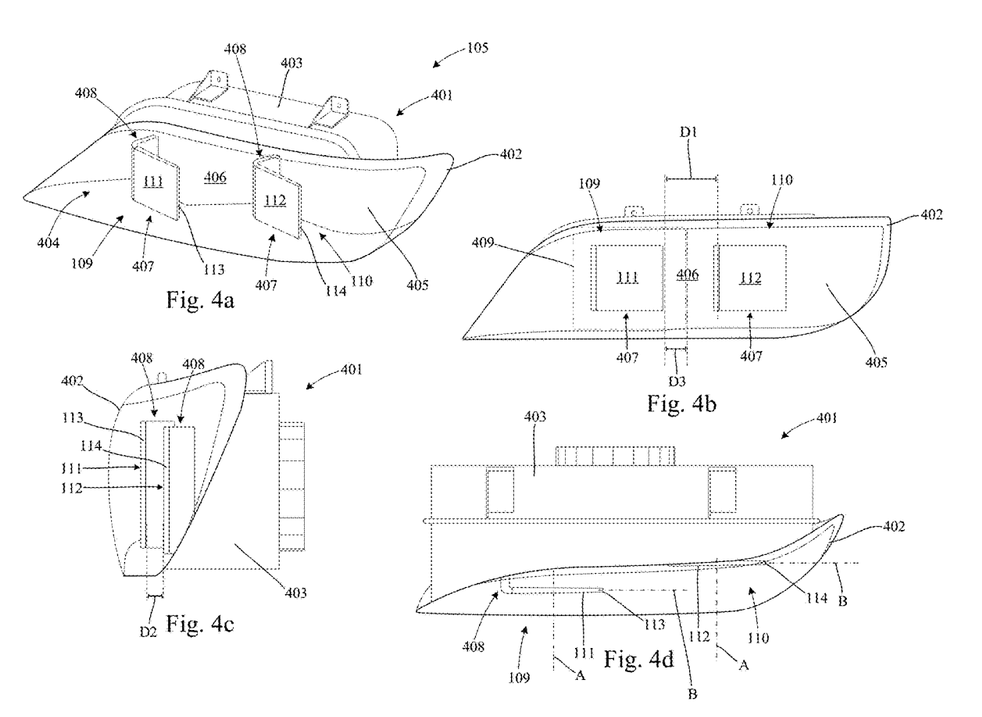
FIGS. 4a, 4b, 4c and 4d are perspective, front elevation, side elevation and top views respectively of a head lamp of the passenger car.

Referring in particular to FIG. 4b, the illuminating portions 407 of the light emitters 109, 110 are spaced apart within the front compartment 404 of the housing 401 in the transverse direction of the vehicle, i.e. sideways, such that the front surfaces 111, 112 respectively of both of the light emitters are visible in a front view of the head lamp assembly. In the example, the illuminating portions 407 of the light emitters are spaced apart in the transverse direction by a distance D1 of approximately 50 millimetre. The front surface 111, 112 of the illuminating portion 407 of each light emitter is rectangular in area, specifically, approximately square in area. The light emitters 109, 110 thus each present a substantially square illuminated surface when the lamp assembly 105 is observed from a front of the vehicle generally along one of the axes A, as may typically be observed by another road user driving towards the vehicle in an opposite direction. The square shape of the illumination as perceived by such a road user may advantageously be easily recognised by an observer as marking a vehicle, as compared, for example, to resulting from a reflection of stray ambient light or another non-vehicular light source. Consequently an observer may be more aware of the vehicle's presence which may reduce the risk of vehicle collisions occurring.

The rectangular front surface 111, 112 of the illuminating portion 407 of each light emitter is substantially lesser in area than the back surface 406, and the illuminating portion 407 and wall 405 are relatively arranged such that the back surface 406 is visible about the area of the rectangular front surface 111, 112 of each of the light emitters 109, 110 respectively, adjacent at least three sides thereof, when the head lamp assembly 105 is viewed along a respective one of the axes A, i.e. in a front view of the vehicle. In this arrangement the anti-reflective back surface 406 thus appears to form a border about the rectangular front surface 406 of each illuminating portion 407 when the head lamp assembly is viewed in the said front view. Such a border is depicted illustratively by the contour 409 in FIG. 4b, although because the back surface 406 has a uniform reflection factor across its full area, in the example the border area is indistinct from the remaining area of the back surface 406, such that the whole visible area of the back surface 406 could be said to constitute the border to the rectangular front surface 111, 112 of each light emitter. Because the back surface 406 has a relatively low light reflection factor, a relative high proportion of incident light will tend to be absorbed on incidence with the back surface rather than reflected. Consequently the back surface 406 may appear relatively dark in colour, so providing a relatively high degree of visual contrast with the light emission of the rectangular front surface 111, 112 of each light emitter 109, 110. The high degree of visual contrast may further accentuate the rectangular shape of the front surfaces of the light emitters and so increase the visual distinctiveness of the lamp assembly 105.

It has been found to be generally advantageous in this regard that the apparent border formed by the back surface 406 about the front surface 111, 112 of each light emitter 109, 110 is relatively great in width, that is to say, it is advantageous that the back surface 406 extends in a direction normal to the axes A a relatively great distance D3 outwardly of the sides of the illuminating portion 407. A relatively great width of the border provides a relatively large area with which the light emission of the rectangular front surfaces 111, 112 of the light emitters contrasts. It has been found that to be visually effective from a distance the border should ideally be arranged to have an apparent width of at least 10 millimetre. In the example, the light emitters 109, 110 and the wall 405 are arranged such that the back surface 406 appears to form a border adjacent three sides of each illuminating portion 407 having a width D3 that is at least 20 millimetre in width.

Referring next in particular to FIG. 4c, the illuminating portions 407 of the light emitters 109, 110 are spaced apart within the front compartment 404 in the longitudinal direction of the vehicle, i.e. in the fore and aft direction of the vehicle, such that the side surface 113, 114 of the illuminating portion 407 of each of the light emitters 109, 110 respectively is visible in a side view of the lamp assembly. In the example, the illuminating portions 407 of the light emitters are spaced apart in the transverse direction by a distance D2 of approximately 15 millimetre. As a result an observer to a side of the vehicle may simultaneously observe the light emission from the side surfaces 113, 114 of both light emitters of the lamp assembly. Consequently the total light emission observed and so the visibility of the vehicle may be increased. Moreover, this arrangement is particularly advantageous where the light emitters of each lamp assembly are assigned different functions, as in the present example, as even from a side of the vehicle the observer may simultaneously observe both light signals. In the example, the illuminating portion 407 of the inboard light emitter 109 is spaced forwardly of the illuminating portion 407 of the outboard light emitter 110. Consequently, the side surface 113 of the illuminating portion 407 of the inboard light emitter 109 is not obscured in side view by the outboard light emitter 110.

Light emitters 109 and 110 are substantially identical in construction, and for brevity therefore only light emitter 109 will be described in detail with reference to FIGS. 5a, 5b and 6.

Figure 5A:
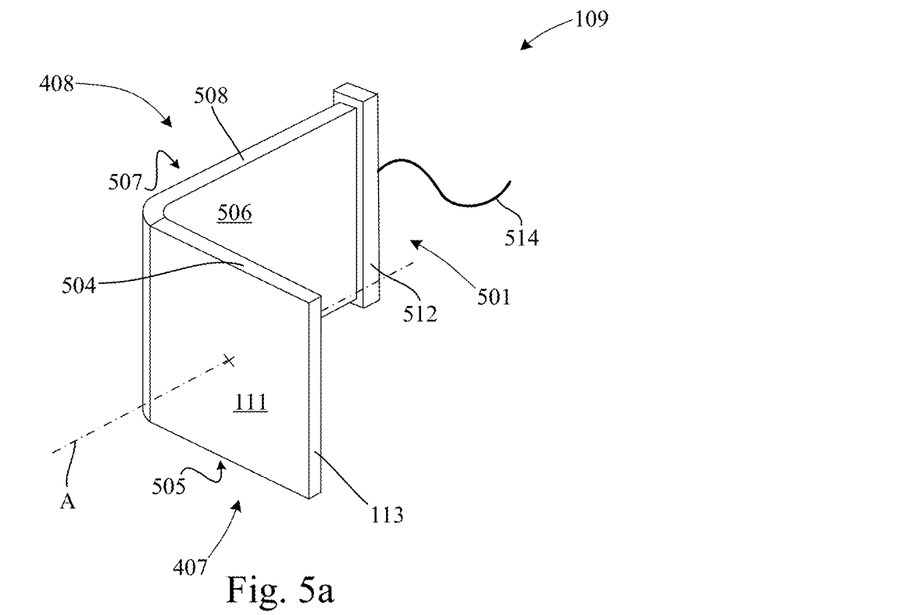
FIGS. 5a and 5b show a light emitter device of the head lamp in isolation in perspective and exploded-perspective views respectively.
Figure 5B:
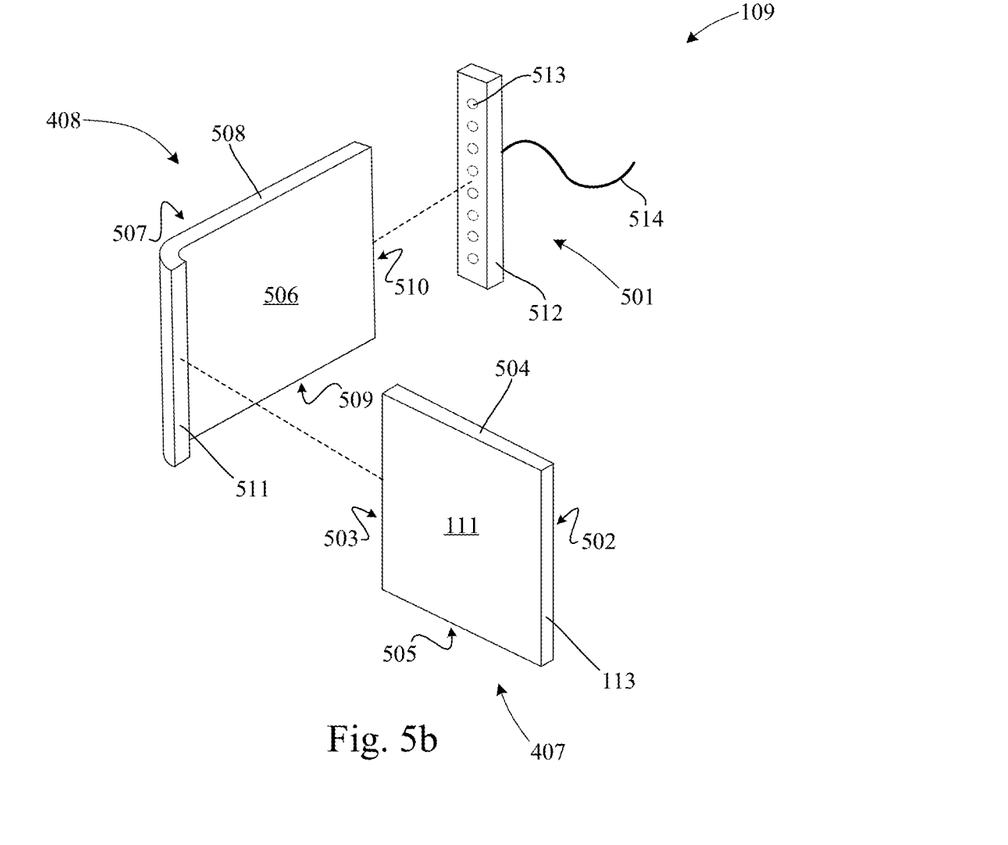

Referring firstly particularly to FIGS. 5a and 5b, light emitter 109 comprises illuminating portion 407, light guide portion 408, and a base portion 501.

Illuminating portion 407 has a plate-like form and is formed of an optically translucent rigid plastic material. The illuminating portion 407 defines the rectangular front surface 111, a similarly rectangular rear surface 502 parallel to the front surface 111, and two pairs of parallel side surfaces 113, 503 and 504, 505 extending between the front and rear surfaces 111, 502 generally normal to the planes of the front and rear surfaces. The front and rear surfaces 111, 502 of the illuminating portion are each substantially square-rectangular in area, having width and height dimensions of approximately 40 millimetre, and the side surfaces 113, 503 area generally rectangular in area having height and width dimensions of approximately 40 millimetre and 5 millimetre respectively. The rectangular front surface 111 and side surfaces 113, 503 are each optically transmissive, such that light may be injected into or emitted from the illuminating portion 407 therethrough. The rear surface 502 and each of the side surfaces 504, 505 are internally reflective, such that light propagating within the illuminating portion is reflected internally and substantially prevented from escaping through the rear surface 502 or the side surfaces 504, 505.

Light guide portion 408 is a generally L-shaped strip formed of the same rigid and optically translucent plastic material as the illuminating portion 407. The light guide portion 408 comprises major surfaces 506, 507, side surfaces 508, 509 and end surfaces 510, 511. The end surfaces 510, 511 of the light guide portion are each optically transmissive such that light may be injected into or emitted from the illuminating portion therethrough. The major surfaces 506, 507 and side surfaces 508, 509 are each internally reflective, such that light propagating within the light guide portion is reflected internally and prevented from escaping through the major surfaces 506, 507 or side surfaces 508, 509.

The base portion 501 comprises a body 512, a plurality of light emitting diodes (LEDs) 513, and an electrical wiring harness 514. The body 510 is formed of rigid plastic and the plurality of LEDs are mounted to the body 501 arranged in a column. The wiring harness 512 is electrically connected to the plurality of LEDs 511, and serves to electrically couple the LEDs to an electronic controller (not shown) mounted to the vehicle at a position remote from the head lamp assembly.

Figure 6:
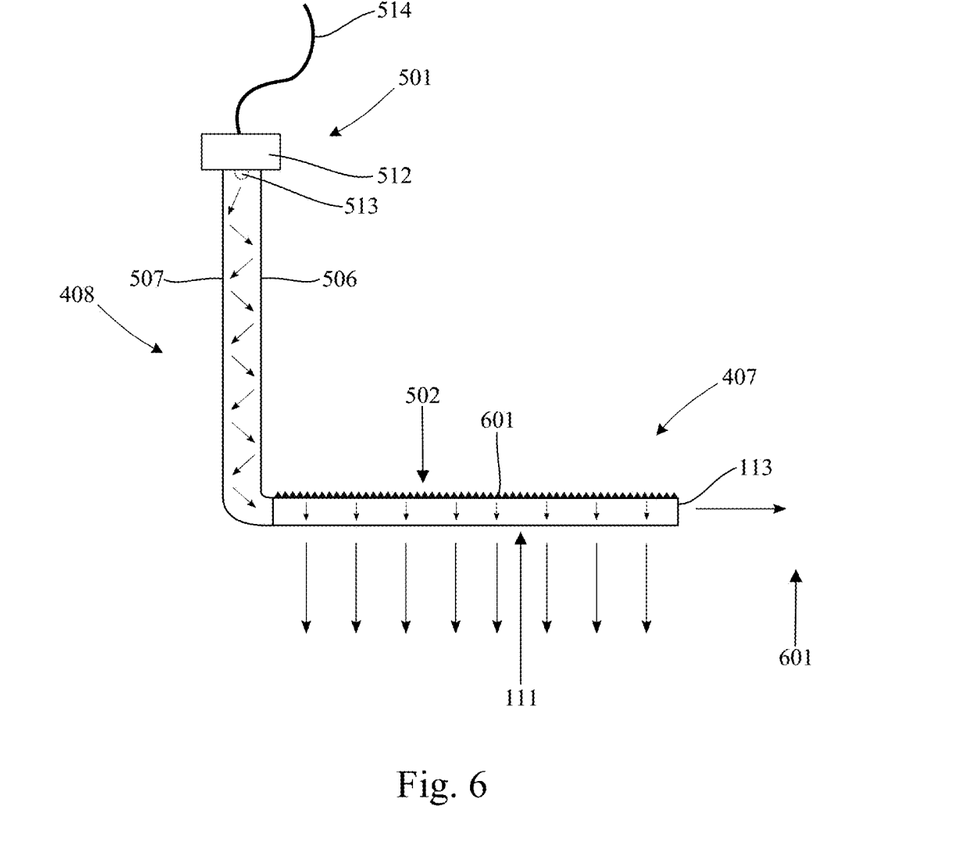
FIG. 6 is an illustrative sectional view of the light emitter device depicting the operation of the device.

In the assembled state shown in FIG. 6, the illuminating portion 407 and light guide portion 408 are arranged with their surfaces 503, 511 abutting, with the side surface 503 of the illuminating portion 407 optically and mechanically coupled to the end surface 511 of the light guide portion 408. The optical coupling between the light guide portion 408 and the illuminating portion 407 permits light to propagate between the interior of the light guide portion 408 and the interior of the illuminating portion 407 via the interface between surfaces 503 and 511. The mechanical coupling between the light guide portion 408 and the illuminating portion 407 provides a rigid coupling therebetween and allows the illuminating portion 407 to be freely supported within the housing 401 by the light guide portion 408. In the example, the coupling is achieved by an adhesive that is optically transparent when cured. Various alternative techniques for coupling the illuminating portion 407 to the light guide portion 408, for example, welding, are well known in the art. As an exemplary alternative to this two-piece construction, the illuminating portion 407 and the light guide portion 408 could instead have a unitary construction. For example, the illuminating portion 407 and light guide portion 408 could be formed of a single piece of optically transparent plastic. Such a unitary construction may advantageously simplify the process of assembling the light emitter 109, and may even be expected to improve propagation of light along the light emitter by removing the surface boundary between the light guide portion 408 and the illuminating portion 407.

The light guide portion 408 is in turn assembled with the end surface 510 optically and mechanically coupled to the base portion 501. The optical coupling between the base portion 501 and the light guide portion 408 is such that the plurality of LEDs 513 of the base portion 501 may inject light into the interior of the light guide portion 408 through the end surface 510. The mechanical coupling between the base portion 501 and the light guide portion 408 provides a rigid coupling therebetween and permits the light guide portion 408, and so the illuminating portion 407 also, to be freely supported by the base portion 501 within the housing 401 of the head lamp 105. In the example, the coupling between the light guide portion 408 and base 501 is achieved using the same optically transparent adhesive, although many alternative means of optical and/or mechanical coupling of the pair could be used, for example, by a simple interference fit between the light guide 408 and the base portion 501.

Referring in particular to FIG. 6, in the assembled state the LEDs 513 of the base portion 501 inject light into the light guide portion 408 through the end surface 510 thereof. The light propagates along the length of the light guide portion 408 by total internal reflection (TIR) off the surfaces 506, 507, 508 and 509. The reflection of the light off the surfaces 506, 507, 508 and 509 as it propagates along the light guide portion results in diffusion and mixing of the light emissions from the plurality of LEDs 513. As the light travels along the light guide portion 408 its average direction is turned through approximately 90 degrees. The light subsequently enters the illuminating portion 407 via the optical coupling between the surface 511 of the light guide portion 408 and the surface 503 of the illuminating portion 407. In the illuminating portion 407, light is again internally reflected by the surfaces 502, 504 and 505. By reflections off the surfaces 502, 504 and 505 light is thus guided along the illuminating portion 407, and in the process further diffused to produce a relatively uniform distribution of light within the illumination portion 407. Rear surface 502 comprises surface features 601, which are micro-recesses, adapted to encourage reflection of incident light forwardly towards the front surface 111 in a direction generally normal to the rear surface 502. Light reflected off the back surface 502 at low angles of reflection, that is to say, angles approaching the normal to the rear surface, will tend to be emitted through the front surface 111 of the illuminating portion 407. Light reflected off the back surface 502 at high angles of reflection, may tend to be emitted, along with a portion of light reflected off the side surfaces 504, 505, from the illuminating portion through the side surface 113.

Figure 7:
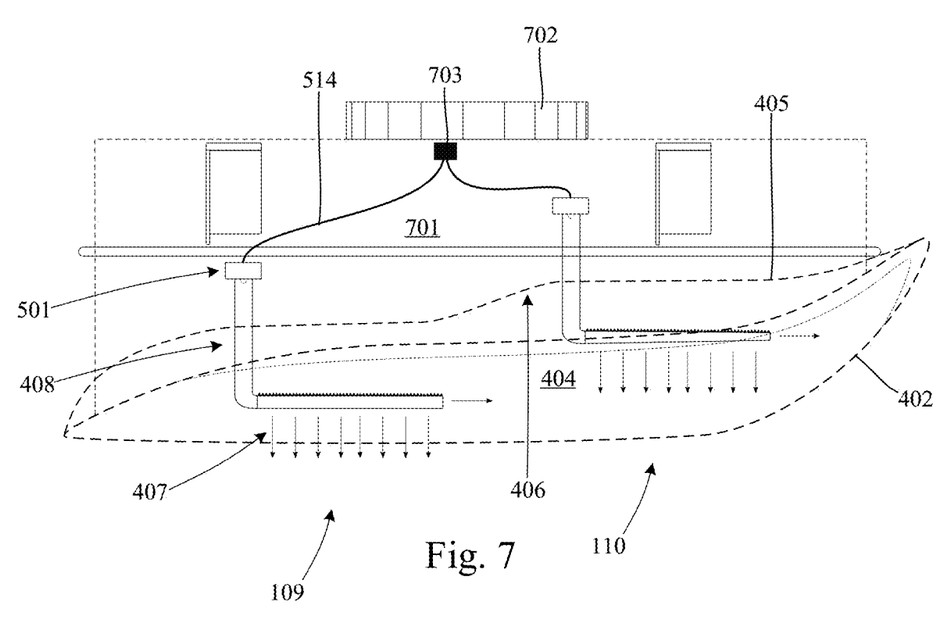
FIG. 7 is a top view of the head lamp in which the housing of the head lamp is depicted transparently and the internals of the head lamp are shown schematically.
Figure 8A:
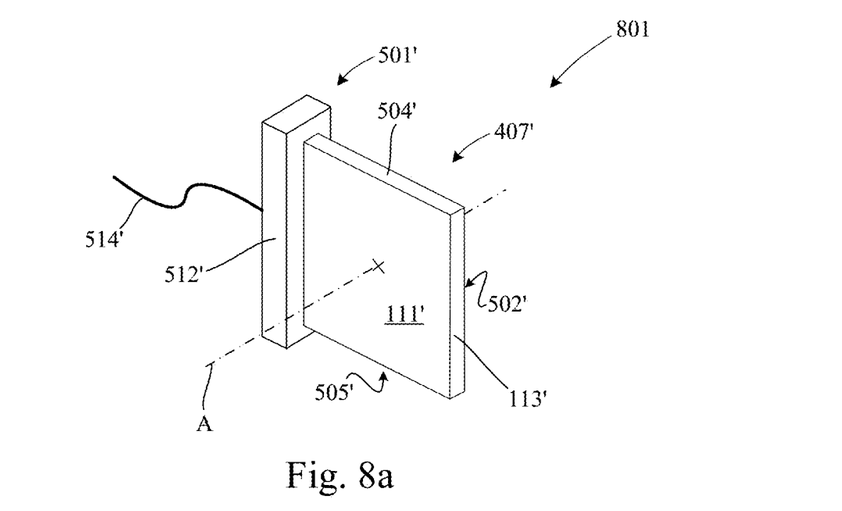
FIGS. 8a, 8b and 8c are perspective, exploded-perspective and top-sectional views respectively of a first alternative light emitter device.
Figure 8B:
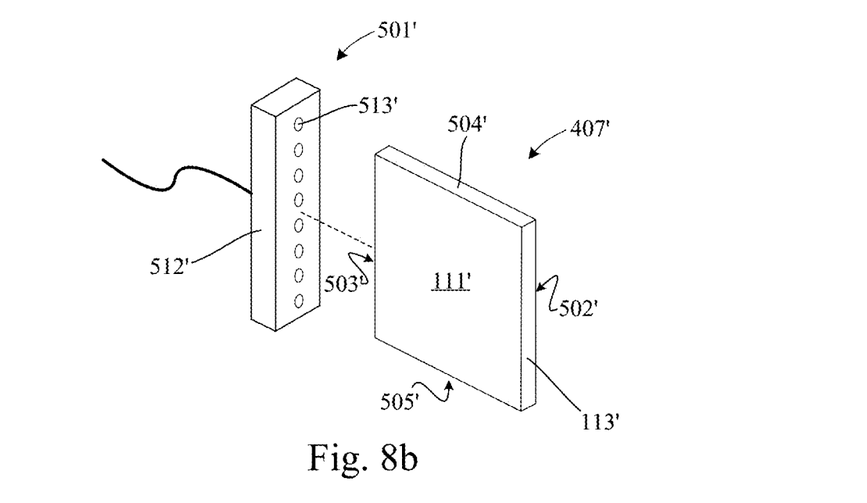
Figure 8C:
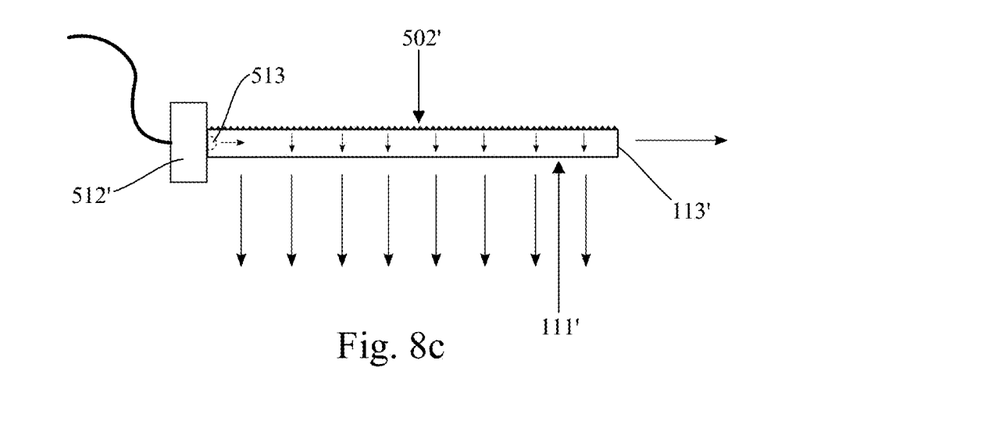

Referring next to FIG. 7, as previously described, the housing 401 comprises a front compartment 404 defined between the lens 402 and the wall 405 of the rear casing 403. As shown best in FIG. 7, the housing 401 further comprises a rear compartment 701 defined by the rear casing 403 behind the wall 405 and separated from the front compartment 404 by the wall. The rear casing 403 comprises an access aperture closed by an access cap 702 that is removable to facilitate access to the interior of the rear compartment 701 for servicing of the lamp assembly 105.

Referring still particularly to light emitter 109, the base portion 501 of the light emitter 109 is located in the rear compartment 701 and rigidly fixed to the rear casing 403. The wiring harness 514 is electrically coupled to an electrical connector 703, and the connector 703 is in turn electrically coupled to an electronic controller of the vehicle (not shown). Because the base portion 501 is located in the rear compartment 701 it is obscured from a front or side view of the lamp assembly 105 through the lens 402, as would be the view of an observer external to the vehicle. The light guide portion 408 extends forwardly from the base portion 501, through a closely conforming aperture in the wall 405 of the rear casing 403, and into the front compartment 404. The illuminating portion 407 is then supported within the compartment 404, in front of the anti-reflective back surface 404 of the wall 405 and behind the lens 402, with the front surface 111 of the illuminating portion 407 arranged to face forwardly through the lens 402 so as to emit light in an averagely forwards direction, and with the side surface 113 arranged to face sidewardly through the lens 402 so as to emit light in an averagely sidewards direction.

Referring next to FIGS. 8a, 8b, 8c and FIG. 9, a second example of a lamp assembly 105' embodying the invention is shown. The principle difference of the second example light assembly 105', as compared to the first example 105 already described with reference to FIGS. 1 to 7, is in the construction of the light emitters 109, 110. In all other respects the lamp assembly 105' is substantially identical to lamp assembly 105, and like reference numerals will be used to denote like features.

Lamp assembly 105' comprises like light emitters 801, 802, each of which comprises a base portion 501' and an illuminating portion 407'. The base portion 501' and illuminating portion 407' of each light emitter are substantially identical to the base portion 501 and illuminating portion 407 respectively of the light emitter 109 of lamp assembly 105. Thus, base portion 501 comprises a body 512' having a plurality of LEDs 513' mounted thereto, and illuminating portion 407' comprises an optically translucent plate having optically transmissive front and side surfaces 111', 113' and 503', and rear and side surfaces 502', 504' and 505' that are internally reflective. In this example base portion 501' is mechanically and optically coupled directly to the side surface of the illuminating portion 407', and the base portion is thus operable to inject light directly into illuminating portion 407' through the side surface 503'. Similarly to light emitter 109, light emitter 801 is thus operable to emit light via the rectangular front surface 111' and through side surface 113' in average directions that are normal to the respective surfaces, as indicated by the arrows in FIG. 8c.

Figure 9:
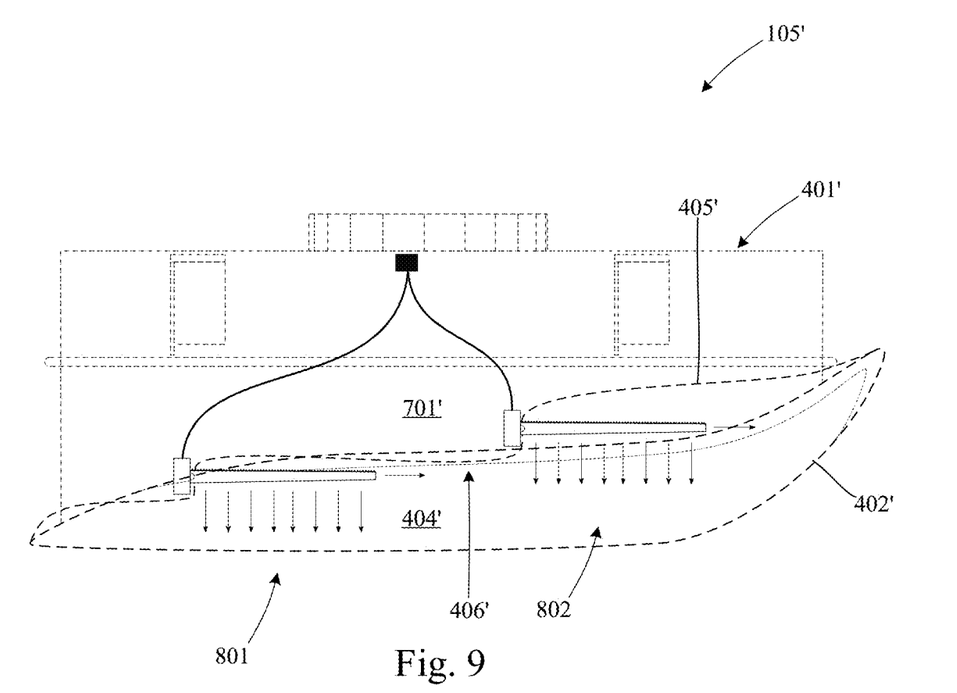
FIG. 9 is a top view of a second embodiment of a head lamp embodying the invention in which the housing of the head lamp is depicted transparently and the internals of the head lamp are shown schematically.
Figure 10A:
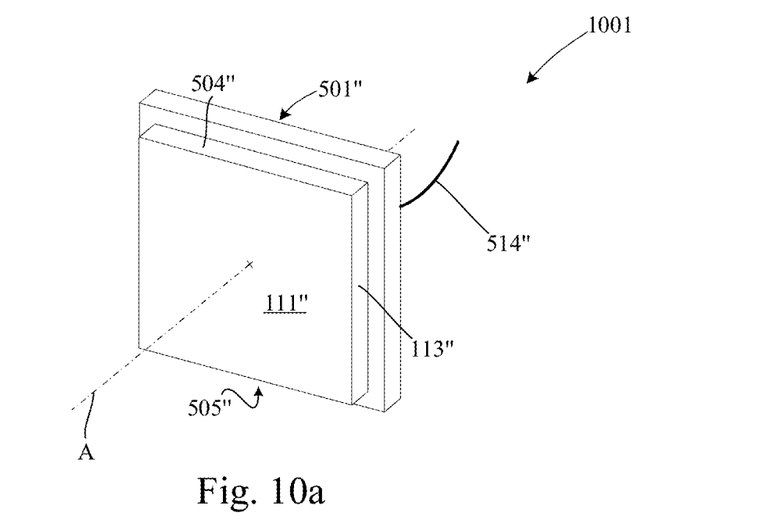
FIGS. 10a, 10b and 10c are perspective, front elevation and top-sectional views respectively of a second alternative light emitter device.
Figure 10B:
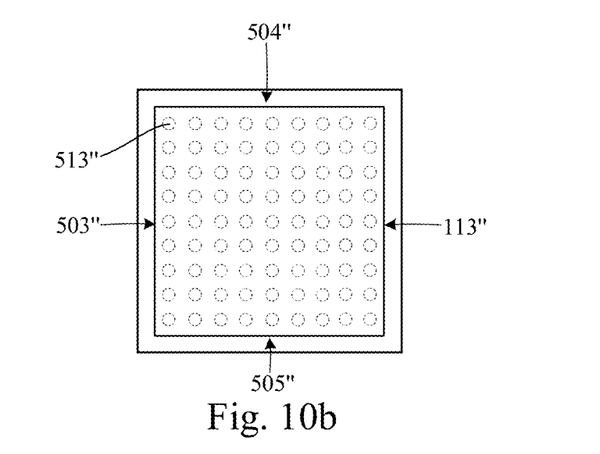
Figure 10C:
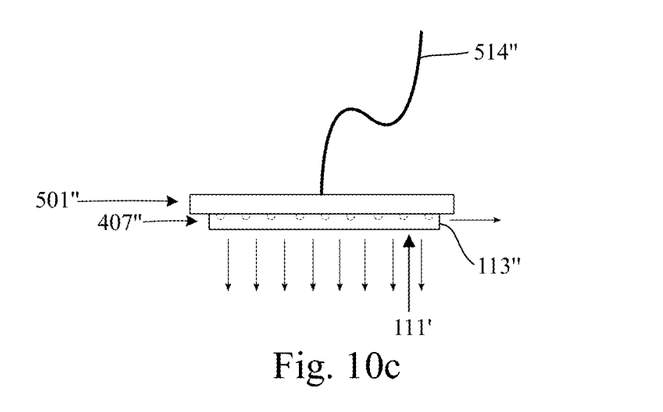

Referring in particular to FIG. 9, the like light emitters 801, 802 are each mounted within the housing 401', arranged with their respective front surfaces 111', 112' facing forwardly through the lens 402' and with their respective side surfaces 113', 114; facing sidewardly through the lens 402'. The light emitters are mutually spaced apart in a side-ways direction such that in a front view of the lamp assembly the front surfaces 111', 112' of both of the light emitters are visible, and spaced apart in a forwards direction such that in a side view of the lamp assembly the side surfaces 113', 114' of both of the light emitters are visible. The base portion 501' of each light emitter is located in the rear compartment 701' and mechanically fixed to the rear casing 401'. The illuminating portion 407' of each extends sidewardly through an aperture in the wall 405' and is supported within the front compartment 404' in front of the anti-reflective back surface 406' of the wall 405' and behind the lens 402'.

An advantage of this second example of a lamp assembly is in the relative simplicity and compactness of the light emitter 801 as compared to the light emitter 109. Specifically, because the LEDs of the base portion 501' inject light into the illuminating portion 407' directly and light guide portion 408 is omitted, the process of assembling the light emitter 801 is simplified, and the volume occupied within the housing 401' by the light emitter 801, as compared to the light emitter 109, is reduced. However, omitting the light guide portion stage 408 may disadvantageously reduce the degree of diffusion of the light that occurs within the light emitter 801 prior to emission of the light from the illuminating portion 407' via the front surface 111' and the side surface 113', which may thereby result in a less uniform distribution of light within the illuminating portion and therefore a less uniform luminosity of the front and side surfaces 111', 113'.

Referring next to FIGS. 10a, 10b, 10c and FIG. 11, a third example of a lamp assembly embodying the invention is shown. The principal difference of the third example light assembly 105", as compared to the first and second examples, is in the construction of the light emitters. In all other respects the lamp assembly 105" is substantially identical to lamp assembly 105 and lamp assembly 105', and again like reference numerals are used to denote like features.

Lamp assembly 105" comprises like light emitters 1001, 1002, each of which comprises a base portion 501" and an illuminating portion 407". The base portion 501" comprises a rigid plastic body 512", to which are mounted a plurality of LEDs 513" arranged in a 9×9 square array facing forwards. The illuminating portion 407" comprises a plate of optically translucent plastic similar to the illuminating portion 407, 407' of first lamp assembly 105 and second lamp assembly 105' respectively. The illuminating portion 407" comprises optically transmissive front and rear surfaces 111", 502", optically transmissive side surface 113', and internally reflective side surfaces 503", 504", and 505'. The illuminating portion 407" is optically and mechanically directly coupled to the base portion 501" via the rear surface 502", and arranged such that the array of LEDs 513" of the base portion 501" inject light into the illuminating portion 407" through the rear surface 502". The illuminating portion 407" is adapted such that a degree of diffusion of the light emissions of the plurality of LEDs 513" occurs within the illuminating portion 407". Light is reflected internally by the side surfaces 503", 504" and 505" and thus substantially prevented from escaping therethrough. Similarly to light emitters 109' and 109", light from the plurality of LEDs 513" is emitted from the illuminating portion 407" through the rectangular front surface 111" and the side surface 113" in average directions that are normal to the respective surfaces, as indicated again by the arrows of FIG. 10c.

Figure 11:
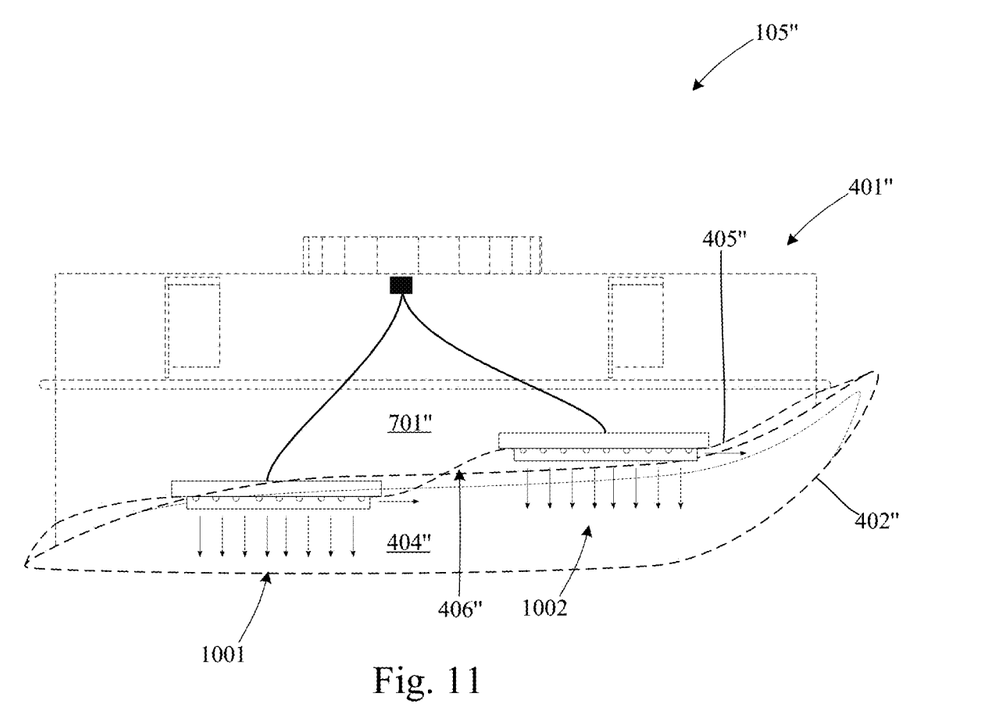
FIG. 11 is a top view of a third embodiment of a head lamp embodying the invention in which the housing of the head lamp is depicted transparently and the internals of the head lamp are shown schematically.

Referring finally in particular to FIG. 11, the like light emitters 109", 110" are each mounted within the housing 401", arranged with their respective front surfaces 111" facing forwardly through the lens 402" and with their respective side surfaces 113" 114" facing sidewardly through the lens 402". The light emitters are again mutually spaced apart in a side-ways direction such that in a front view of the lamp assembly the front surfaces 111", 112" of both of the light emitters are visible, and spaced apart in a forwards direction such that in a side view of the lamp assembly the side surfaces 113", 114" of both of the light emitters are visible. The base portion 501" of each light emitter is located in the rear compartment 701" and mechanically fixed to the rear casing 402". The illuminating portion 407" of each light emitter extends forwardly through an aperture in the wall 405" and is supported within the front compartment 404" forwardly of the anti-reflective surface 406" of the wall 405" and behind the lens 402". Similarly to the lamp assembly 105", this third example of the light emitter 109" is advantageously relatively simpler in construction than the light emitter 109 of lamp assembly 105.

The invention claimed is:

1. A vehicle head or tail lamp assembly, comprising: a light emitter having a square surface from which light is emitted; and a back surface having a light reflection factor less than 80%, wherein the back surface defines a border visible adjacent at least three sides of the square surface when the lamp assembly is viewed along an axis projecting normally from the square surface.

2. The lamp assembly of claim 1, wherein the back surface has a light reflection factor less than 20%.

3. The lamp assembly of claim 1, wherein the light emitter comprises a non-incandescent light source for generating the light emitted from the square surface.

4. The lamp assembly of claim 1, wherein the back surface is non-mirrored.

5. The lamp assembly of claim 1, wherein the border has a width of at least 20 mm.

6. The lamp assembly of claim 1, wherein corners of the square surface have radii of curvature less than 5 millimeter.

7. The lamp assembly of claim 1, wherein the lamp assembly comprises a housing, and the back surface is defined by an anti-reflective surface coating applied to a wall of the housing.

8. The lamp assembly of claim 7, wherein the anti-reflective surface coating is non-metallic.

9. The lamp assembly of claim 1, wherein the back surface extends behind the square surface of the light emitter.

10. The lamp assembly of claim 9, wherein the back surface extends forwardly of the square surface of the light emitter.

11. The lamp assembly of claim 1, wherein the light emitter comprises an illuminating portion that defines the square surface, the back surface extends behind the illuminating portion, and the illuminating portion is translucent or transparent when viewed along the axis normal to the square surface.

12. The lamp assembly of claim 1, comprising a further light emitter spaced apart from the light emitter, wherein a portion of the border is visible between the square surface of the light emitter and the further light emitter when the lamp assembly is viewed along the axis projecting normally from the square surface of the light emitter.

13. The lamp assembly of claim 12, wherein the further light emitter comprises a further square surface from which light is emitted, and the further square surface is arranged parallel to the square surface.

14. The lamp assembly of claim 13, wherein the back surface defines a further border visible adjacent at least three sides of the further square surface when the lamp assembly is viewed along a further axis projecting normally from the further square surface, and the further border appears continuous with the border when viewed along the further axis.

* * * * *